US006728453B2

(12) United States Patent
Petryszak

(10) Patent No.: US 6,728,453 B2
(45) Date of Patent: Apr. 27, 2004

(54) METHOD OF DETERMINING LAY LENGTH OF S-Z STRANDED BUFFER TUBES IN OPTICAL FIBER CABLE DURING MANUFACTURING

(75) Inventor: Michael Petryszak, W. Columbia, SC (US)

(73) Assignee: Pirelli Communications Cables and Systems USA, LLC, Lexington, SC (US)

(*) Notice: Subject to any disclaimer, the term of this patent is extended or adjusted under 35 U.S.C. 154(b) by 12 days.

(21) Appl. No.: 09/891,364

(22) Filed: Jun. 27, 2001

(65) Prior Publication Data

US 2003/0002830 A1 Jan. 2, 2003

(51) Int. Cl.[7] ................................................ G02B 6/44
(52) U.S. Cl. ...................................... 385/104; 385/111
(58) Field of Search ................................. 385/100–121

(56) References Cited

U.S. PATENT DOCUMENTS 5,745,628 A * 4/1998 Benzel et al. ................. 156/64
6,175,801 B1 * 1/2001 Millington .................. 701/207

FOREIGN PATENT DOCUMENTS

| DE | 3641816 A1 | 6/1988 |
| DE | 19605492 A1 | 8/1997 |
| DE | 19742177 A1 | 4/1999 |
| DE | 19811573 C1 | 6/1999 |

* cited by examiner

Primary Examiner—Tarifur R. Chowdhury
Assistant Examiner—Richard H Kim
(74) Attorney, Agent, or Firm—Finnegan, Henderson, Farabow, Garrett & Dunner, L.L.P.

(57) ABSTRACT

A system and method for determining the lay length of S-Z stranded buffer tubes during the manufacturing process of a fiber optic cable without slowing down the manufacturing process. Images of an S-Z stranded buffer tube are captured with a camera. The images are sent from the camera to a computer workstation. The computer workstation displays the images taken with the camera and executes programming modules that calculate the lay length of the S-Z stranded buffer tube during the manufacturing process of the cable. Input devices such as a mouse and a keyboard may be used in conjunction with the operations of the computer workstation. By measuring the lay length during cable manufacture, productivity may be maintained while ensuring that the stranding of buffer tubes does not fall out of tolerance, which might result in deleterious bending stress of optical fibers within the buffer tubes.

17 Claims, 7 Drawing Sheets

METHOD OF DETERMINING LAY LENGTH OF S-Z STRANDED BUFFER TUBES IN OPTICAL FIBER CABLE DURING MANUFACTURING

BACKGROUND OF THE INVENTION

The present invention relates to optical fiber cables that have buffer tubes arranged in S-Z strands, and in particular a method of determining the lay length of such S-Z strands during the manufacturing process.

In telecommunication cables, optical fibers or optical fiber ribbons are often used as a medium to transmit optical signals. These cables often have a central strength member, such as a steel rod or stranded steel wires, that extends longitudinally along the central axis of the cable. As shown in FIG. 1 (from U.S. Pat. No. 5,229,851, which is incorporated by reference), central strength member 2 is intended to withstand and resist any tensile or compressive force applied axially to the cable 1. The central strength member 2 is often encircled by a covering 3, which may serve as a cushioning material. A plurality of plastic buffer tubes 4–8 surround covering 3 and loosely house protect optical fibers or ribbons within them. A binder thread or threads 17 and 18 are often contrahelically applied around buffer tubes 4–8 to hold them in place. A water swellable tape (not shown) may be applied over the buffer tubes to block water ingress into the cable. An overall plastic jacket 20 then covers the contents of optical fiber cable 1. If the intended installation for cable 1 requires extra mechanical strength, the cable may include additional strength members in the form of armor or strength yarns 19 placed intermediate the water swellable tape and the jacket.

As shown in FIG. 1, buffer tubes 4–8 are generally wrapped around central strength member 2 in a reverse helix or "S-Z" fashion. The locations at which the stranded tubes reverse direction (e.g. from an "S" to a "Z") are referred to as reversal points. S-Z stranding of buffer tubes in general, and the reversal points in particular, are advantageous for accessing the cable midspan. That is, due to the S-Z stranding, one or more optical fibers within the cable may be "tapped" at the reversal points without having to sever the cable or to carry out major reconfiguration. The S-Z stranding provides sufficient excess of tube length to make the tap easy by opening the side of the cable at a point along its length without losing the desired slack in the ribbon units or optical fibers within the tube that is opened. Thus, taps in an S-Z stranded cable can be made without interrupting other tubes or ribbon units.

To ensure that the optical fibers within the buffer tubes are not subjected to bending stress, which may cause unwanted attenuation, a parameter of the S-Z stranded buffer tubes called "lay length" needs to be monitored. Bending stress is a loss mechanism in optical fibers that may occur if the cable is subjected to tensile forces, either from installation or temperature, or compression forces. Bending stress may cause signal loss in the optical fibers. The S-Z strand of buffer tubes in an optical fiber cable may take several forms. Each 'S' turn may be followed immediately by a reversal to a 'Z' stranding direction. Alternatively, there may be several helical turns between reversals. In general, then, the average lay length is defined by the distance between reversal points divided by the number of turns between reversals.

The actual lay length of each individual S-Z stranded tube will vary from the average lay length by a small amount due to additional twisting and processing conditions. That is, the lay length of any given tube, may be more or less than the average lay length, as a given tube may make more than a whole number of turns between reversals. For example, in a cable with 6 different colored buffer tubes, one being red, and all S-Z stranded around a central member, the red tube may be at the top or at the 12 o'clock position on the cable at the first reversal point. But at the next reversal point the red tube may be at the 6 o'clock position on the cable, 3 tubes removed from the 12 o'clock position. Thus, the red tube has gone one half turn more between reversals. This half-turn must be included in the lay length calculation for the most accuracy. Thus, the actual lay length of a given S-Z stranded buffer tube is comprised of several components and can be calculated to close approximation by:

$$\text{Lay Length} = D/N,$$

where:

$$N = N' + n/T$$

where D is the axial distance between the reversal points, N is the number of turns between reversals, and N' is the number of whole turns between the reversal points; n is the number of tubes which a given tube is offset from its angular position on the previous reversal point, counted in the direction of rotation; and T is the total number of buffer tubes.

To protect against bending stress on the optical fibers, the lay length of the S-Z stranded buffer tubes is checked on finished cable to verify that the lay length is within acceptable specifications. The only way to check the lay length on finished cables is to strip back the jacket and other layers in the cable over the buffer tubes. It is not sufficient to do this on the cable ends as the start-up and finish of the stranding process may have been done at conditions that vary from the rest of the cable. Instead, lay length has been measured manually during the manufacturing process after stranding. The line operator would make the length measurement while walking alongside the progressing cable, which was fairly easy to accomplish accurately because line speeds were slow. More recently, however, line speeds have increased dramatically, making this type of manual measurement inaccurate. One alternative is to stop the line periodically to take measurements. However this is impractical and inefficient.

Many methods of determining the lay length of S-Z stranded optical fiber cables require the detection of lay reversal points of the S-Z stranded buffer tubes. One approach to the lay reversal detection problem is described in U.S. Pat. No. 5,809,194. In this patent, a process for marking an outer jacket of an oscillating lay cable (including S-Z stranding) to indicate the locations of the lay reversal points under the jacket is described. This process includes the step of providing detectable markings on an unjacketed cable core in predetermined positions relative to the lay reversal points. The process further includes the step of sensing the detectable markings with a sensor (such as a luminescence scanner) prior to extruding an outer jacket over the cable core. Next, the process includes predicting the location of the sensed markings on the cable core after a cable jacket has been extruded and providing markings on the cable jacket at predetermined positions relative to the predicted location of the sensed markings.

Another approach to the lay reversal detection problem is described in U.S. Pat. No. 5,745,628. In this patent, similar to the '194 patent, a process and apparatus for marking an outer jacket of an S-Z stranded cable to indicate the lay reversal points under the jacket is described. This process comprises passing a portion of a cable core within a field of view of an imaging means to acquire an image of that portion of the cable core. This imaging means includes a camera connected to a vision inspection/image acquisition system. The quantity of visually distinguishable conductors in the acquired image is compared to a reference value. If the reference value is exceeded, a lay reversal point is indicated. Once a lay reversal point is indicated, its position is tracked through an outer jacketing step. A marking to indicate the location of a lay reversal point is applied to the outer jacket according to the tracked position of the lay reversal point.

Yet another approach to the lay reversal detection problem is described in U.S. Pat. No. 5,729,966. In this patent, similar to the '194 and '628 patents, a method for marking sections of a fiber optic cable so that lay reversal points can be indicated on an exterior surface of the fiber optic cable is described. The method includes the steps of: 1) determining a current length value of the cable; 2) measuring an offset distance value, the offset distance being a length measurement between a lay reversal point of the cable and a marking device; 3) entering the offset distance value into a memory; 4) as a lay reversal point is being made, adding the current length value to the offset distance to define a sum value; 5) comparing the sum value to the current cable length value; and 6) when the sum value equals the current cable length value, activating the marking device, whereby the marking device marks the cable section.

None of these patents, nor any reasonable combination of them, teaches, suggests, or discloses a system or method of determining the lay length of S-Z stranded buffer tubes during the manufacturing process of a fiber optic cable. While the '194 patent discloses using a sensor to detect a mark placed on a lay reversal point, and the '628 patent discloses using a camera and vision inspection/image acquisition system to detect an unmarked lay reversal point, neither of them discloses using the detected lay reversal point to determine the lay length of S-Z strands during the manufacturing process.

Consequently, Applicants have discovered that conventional techniques do not provide a method or system to accurately measure the lay length of S-Z stranded buffer tubes during the manufacturing process without slowing down the manufacturing process and that conventional techniques do not automate the method or system such that the measurement data is stored for future reference.

SUMMARY OF THE INVENTION

In accordance with the present invention, a method and system for determining the lay length of S-Z strands during the manufacturing process are provided that avoid the problems associated with prior art methods and systems for determining the lay length of S-Z strands during the manufacturing process.

In one aspect, a method of measuring the lay length of buffer tubes S-Z stranded on an optical fiber cable core while advancing the core during manufacturing consistent with the invention includes capturing an image of the S-Z stranded buffer tubes containing at least two reversal points on the advancing core. Capturing an image may be accomplished by triggering a camera to take at least one image of the advancing core. In addition, capturing the image may be accomplished by capturing a plurality of preliminary images and splicing the plurality of preliminary images together. Once the image is captured, the method continues by downloading the captured image to a storage device and measuring the lay length of the S-Z stranded buffer tubes via the storage device. The method may include storing the captured image and the lay length measurement in the storage device or assembling the image into a bitmap on the displaying means.

Preferably, measuring the lay length may comprises positioning cursors at the reversal points on the displayed image and determining the distance between the cursors in order to determine the distance between the reversal points. In addition, measuring the lay length may include counting the number of complete turns between the two reversal points on the displayed image; determining the number of fractional turns between the two reversal points on the displayed image; and calculating the lay length. In calculating the lay length, the following relation may be used.

$$\text{Lay Length} = D/(N'+n/T)$$

In the above relation, D is the distance between the reversal points, N' is the number of complete turns between the reversal points, and n/T is the fractional number of turns between the reversal points.

In another aspect, a system of measuring the lay length of buffer tubes S-Z stranded on an optical fiber cable core while advancing the core during manufacture consistent with the invention includes a camera configured to capture an image of the S-Z stranded buffer tubes containing at least two reversal points on the advancing core. The image may comprise a plurality of preliminary images spliced together. The system also includes a computer configured to receive the captured image and to determine the lay length of the S-Z stranded buffer tubes captured in the image. Preferably, the computer is configured to store the image and the lay length, and may be further configured to display the image. The computer may display the image by converting the image into a displayable format and placing the image on a display. The displayable format may be selected from the group comprising tagged image file format (tif), graphics interchange format (gif), joint photographic experts group format (jpeg), and bit map format (bmp).

Preferably, the computer is further configured to determine the lay length of the S-Z stranded buffer tubes by calculating the lay length using the following relation.

$$\text{Lay Length} = D/(N'+n/T)$$

In the above relation, D is the distance between the reversal points, N' is the number of complete turns between the reversal points, and n/T is the fractional number of turns between the reversal points. N' may be received through user input into the computer and D may be received through user input into the computer by the user positioning cursors at the reversal points of the image displayed by the computer. The computer may determine the distance D based upon the cursors' positions by detecting the two reversal points of the image and determining the distance D based upon the distance between the detected reversal points.

It is to be understood that both the foregoing general description and the following detailed description are exemplary and explanatory only and are intended to provide further explanation of the invention as claimed. The following description, as well as the practice of the invention, set forth and suggest additional advantages and purposes of the invention.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

Figure 1:
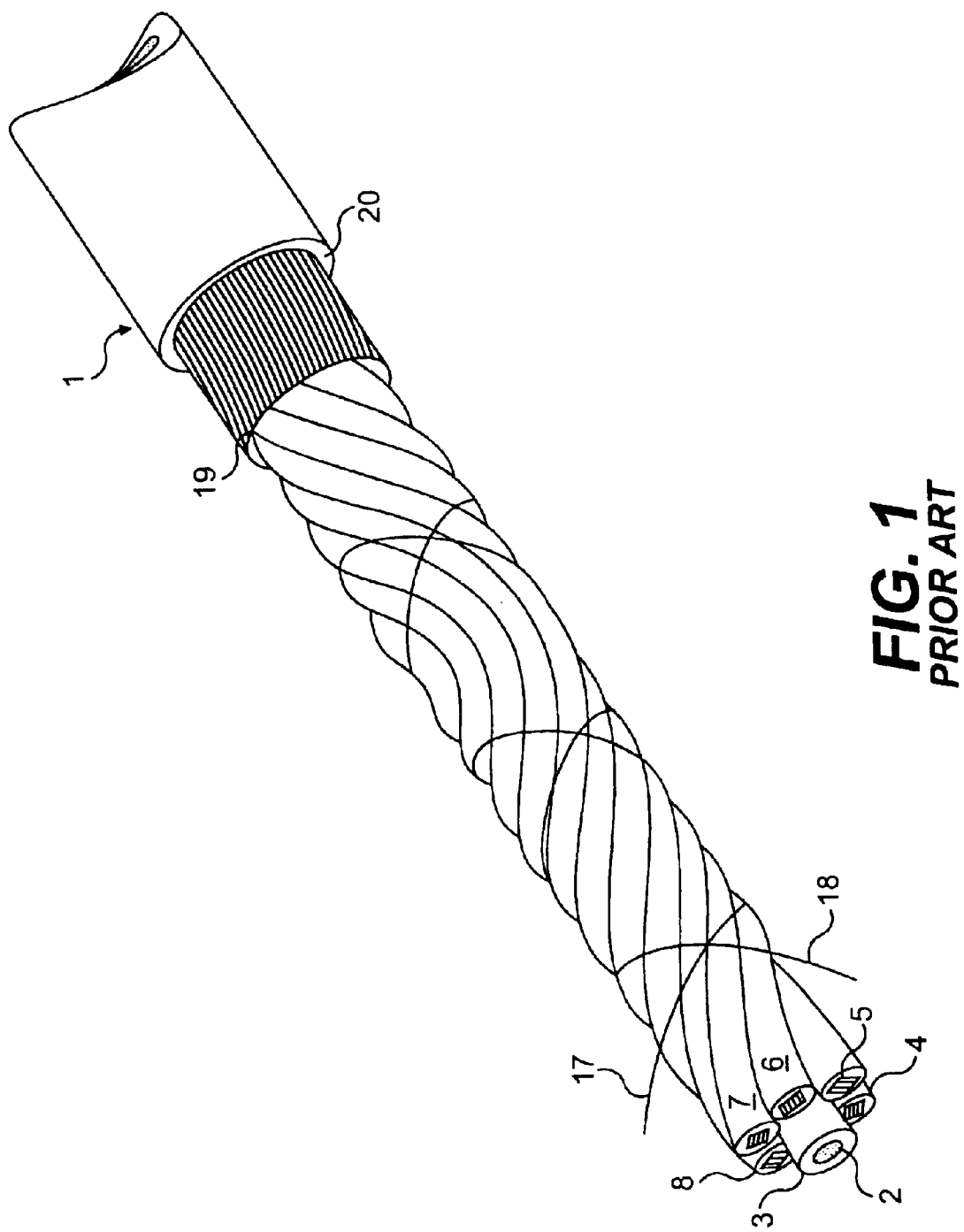
FIG. 1 is a diagrammatical view of an exemplary fiber optic cable according to the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Broadly stated, the invention is a system and method of monitoring the lay length of S-Z strands during the manufacturing process. More particularly, the present invention provides for determining the lay length of such S-Z strands during the manufacturing process without slowing down the manufacturing process.

Figure 2:
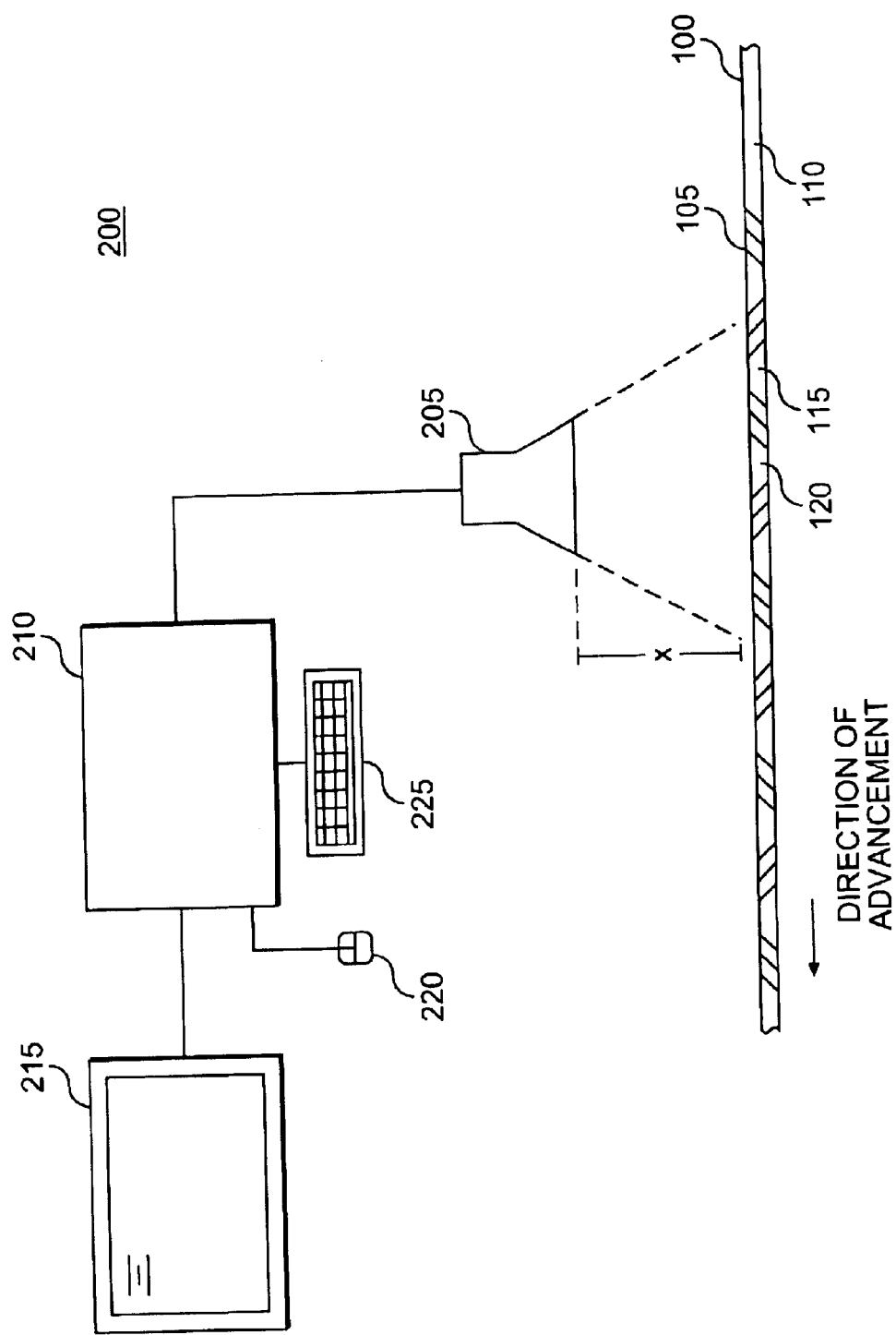
FIG. 2 is a functional block diagram of a system for determining the lay length of S-Z strands during the manufacturing process consistent with the present invention.

FIG. 2 illustrates a system for determining the lay length of S-Z strands during the manufacturing process in accordance with a preferred embodiment of the present invention. Generally shown is a camera 205 which captures images of a buffer tube 105 that is stranded about a single cable core 110, such as a central strength member. These images are captured while the fiber optic cable 100 is moving in a manufacturing line parallel to the lens of camera 205. The fiber optic cable 100 need not be slowed in the manufacturing process in order to practice the invention, but rather the manufacturing line can be run at its normal line speed. As will be understood by one of ordinary skill in the art, a "normal line speed" depends on a variety of factors, including the type of cable being manufactured for a given cable, however, a normal line speed implies the typical or average speed of the cable over a period of manufacturing. Such line speeds are known by those skilled in the art.

Specifically, the images are captured when the fiber optic cable 100 is in the state of manufacture after the buffer tube has been S-Z stranded. Also, it is advantageous if the images are captured after binder threads have been wound around the stranded buffer tube to hold the buffer tube in position, but before a water swellable tape has been applied over the S-Z stranded buffer tube 105. While FIG. 2 shows only one S-Z stranded buffer tube around cable core 110, those skilled in the art will appreciate that a plurality of buffer tubes may be stranded about a single cable core 110, such as in the fashion depicted in FIG. 1. The buffer tubes are different colored (completely colored or striped) so as to allow their identification by the user or by an image recognition software module, as described below. The present invention can be practiced when only one S-Z stranded buffer tube is stranded around the cable core 110 or when a plurality of buffer tubes are stranded about the cable core 110.

The images captured by camera 205 are sent to a computer workstation 210. Computer workstation 210 provides for displaying the images taken with the camera 205 on a display 215, which may comprise a monitor. In addition, computer workstation 210 provides for executing programming modules that accept user input and calculate the lay length of the S-Z stranded buffer tube 105 during the manufacturing process without slowing down the manufacturing process. Input devices such as a mouse 220 and a keyboard 225 may be utilized to obtain user input in conjunction with the operation of the computer workstation 210.

Preferred systems and methods of the present invention use a personal computer or other similar microcomputer-based equipment in implementing computer workstation 210. However, those skilled in the art will appreciate that computer workstation 210 may comprise any type of computer such as hand-held devices, multiprocessor systems, microprocessor-based or programmable consumer electronics, minicomputers, mainframe computers, and the like. The computer workstation 210 may also be practiced in distributed computing environments where tasks are performed by remote processing devices.

Figure 3:
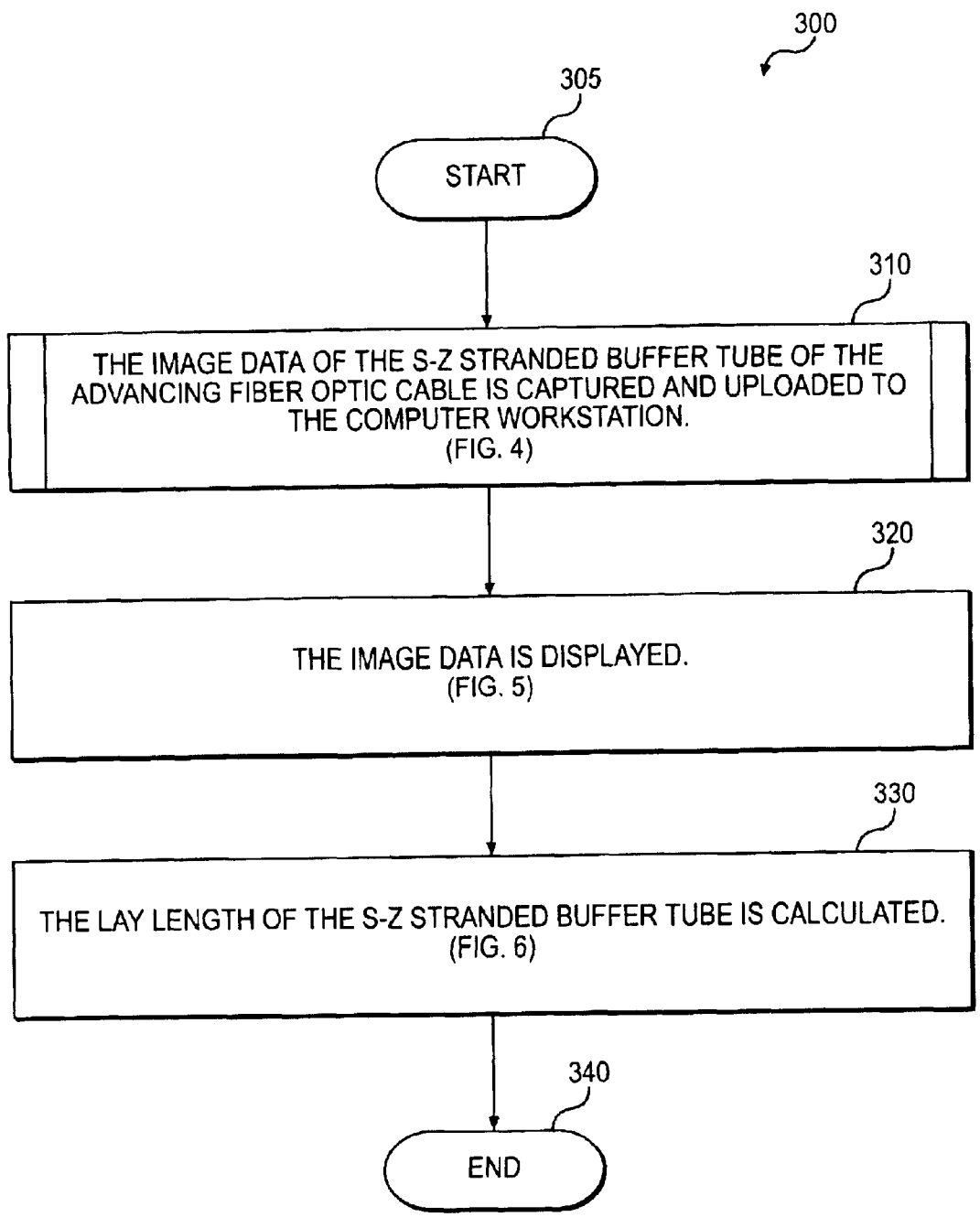
FIG. 3 is a flow chart of a method for determining the lay length of S-Z strands during the manufacturing process consistent with the present invention.

FIG. 3 is a flow chart setting forth the general steps involved in an exemplary method 300 for determining the lay length of S-Z strands during the manufacturing process. The implementation of the steps of method 300 in accordance with an exemplary embodiment of the present invention will be described in greater detail in FIG. 4 through FIG. 6.

Figure 4:
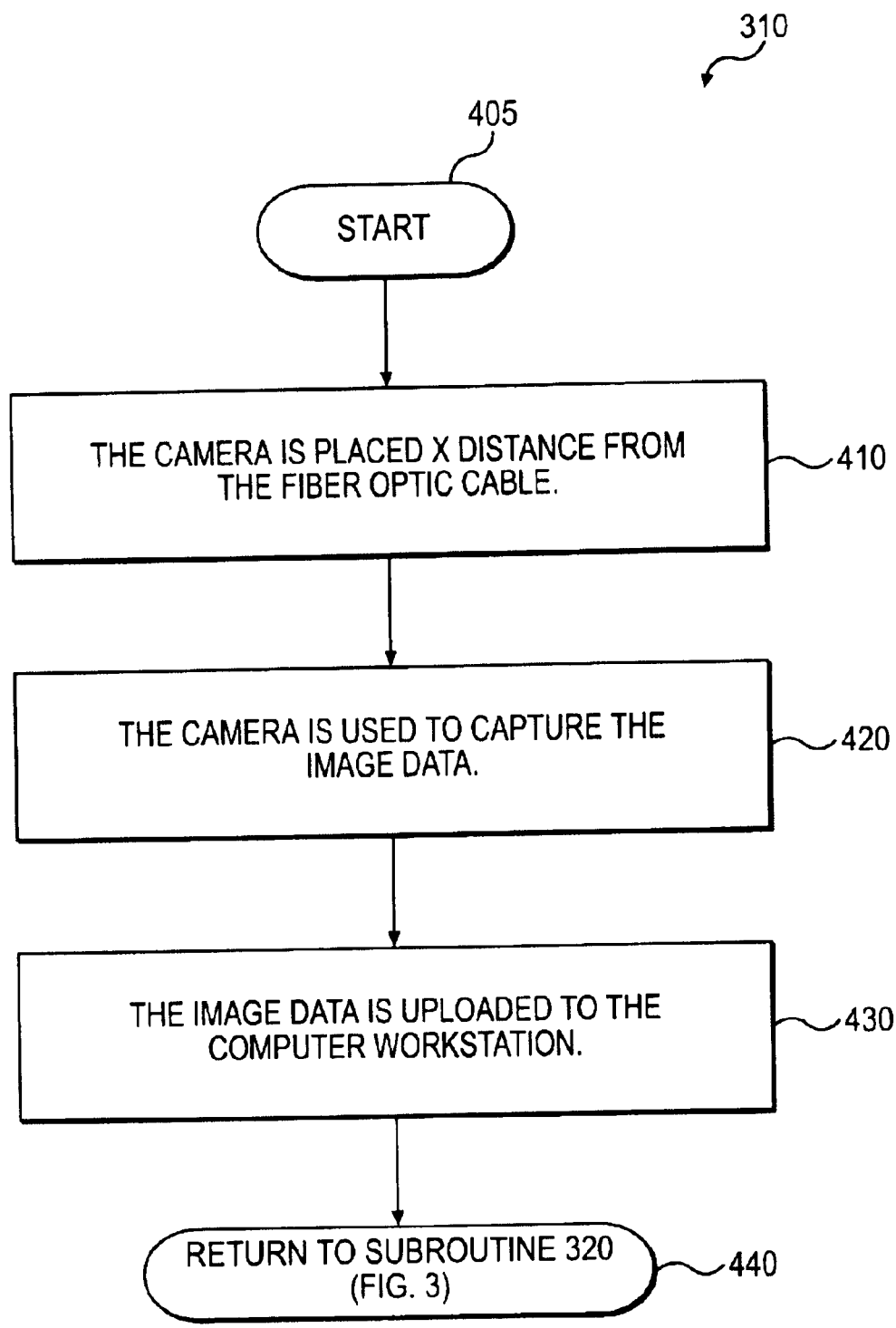
FIG. 4 is a flow chart of a subroutine, used in the method of FIG. 3, for capturing and uploading to the computer workstation the image data of the S-Z stranded buffer tube of the advancing cable core is.
Figure 5:
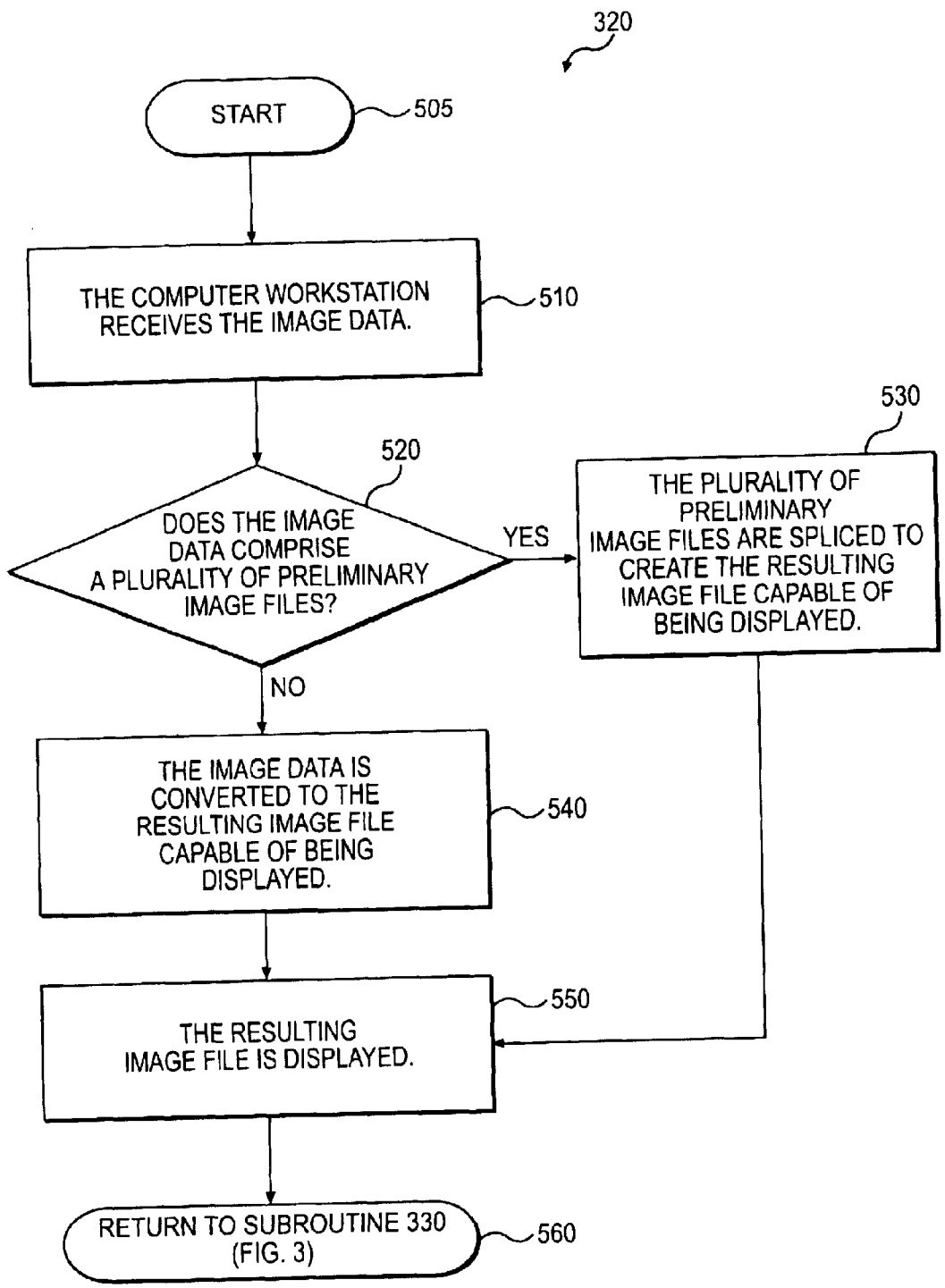
FIG. 5 is a flow chart of a subroutine, used in the method of FIG. 3, for displaying the image data.
Figure 6:
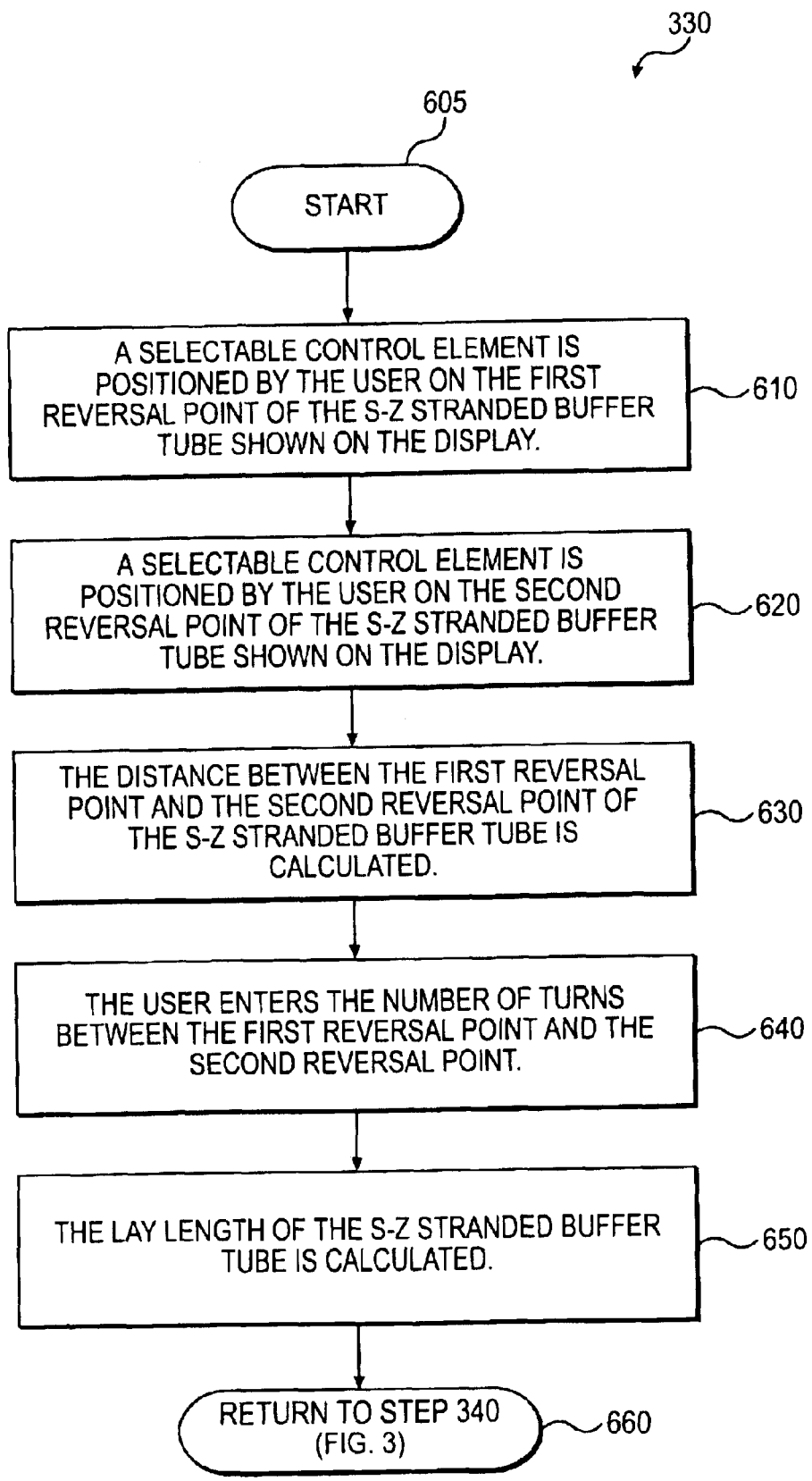
FIG. 6 is a flow chart of a subroutine, used in the method of FIG. 3, for calculating the lay length of the S-Z stranded buffer tube.

Exemplary method 300 begins at starting block 305 and proceeds to subroutine 310 where the image data of the S-Z stranded buffer tube 105 of the advancing fiber optic cable 100 is captured and uploaded to the computer workstation 210. The steps comprising subroutine 310 are shown in FIG. 4 and will be described in greater detail below. Next, the method proceeds to subroutine 320 where the image data is displayed. The steps of subroutine 320 are shown in FIG. 5 and will be described in greater detail below. The method continues to subroutine 330 where the lay length of the S-Z stranded buffer tube 105 is calculated. The steps of subroutine 330 are shown in FIG. 6 and will be described in greater detail below. From subroutine 330, exemplary method 300 ends at step 340.

FIG. 4 describes the exemplary subroutine 310 from FIG. 3 in which the image data of the S-Z stranded buffer tube 105 of the advancing fiber optic cable 100 is captured and uploaded to the computer workstation 210. Exemplary subroutine 310 begins at starting block 405 and proceeds to step 410 where the camera 205 is placed X distance from the fiber optic cable 100. In practice, a distance of about 7 feet (i.e about 2.1 m) has been found to be optimal for the distance X, but those skilled in the art will appreciate that distance X will vary as a function of the physical conditions present and as a function of the type of camera 205 used. As mentioned, cable core 110 is in the state of manufacture after the buffer tube has been S-Z stranded, and after binder threads to hold the buffer tube in position have been contrahelically wound on the stranded buffer tube, but before a water swellable tape has been applied over S-Z stranded buffer tube 105.

Once camera 205 is placed in step 410, exemplary subroutine 310 advances to step 420 where the camera 205 is used to capture the image data. Camera 205 may comprise a digital camera that records images in a digital file. Unlike traditional analog cameras that record infinitely-variable intensities of light, digital cameras record discrete numbers for storage on a flash memory card, floppy disk or hard disk. As with all digital devices, there is a fixed, maximum resolution and number of colors that can be represented.

Camera 205 is triggered by the user to capture the image data. This triggering can be facilitated by a programming module in the computer workstation 210. Specifically, the user enters instructions into the computer workstation 210, which in turn causes the camera 205 to capture the image data. Those skilled in the art will appreciate that the triggering of camera 205 and thus the capturing of the image data may be accomplished by other processes including automatically detecting the reversal oscillations of the strandings, taking into consideration a distance or time adjustment. The images may be transferred to the computer workstation 210 with a serial cable, USB cable or similar technique, or via the storage medium itself if the computer workstation 210 has a counterpart reader. Digital cameras record color images as intensities of red, green and blue, which are stored as variable charges in a CCD matrix. The size of the matrix determines the resolution, but an analog-to-digital converter (ADC), which converts the charges to digital data, determines the color depth.

After the camera 205 is used to capture the image data in step 420, exemplary subroutine 310 advances to step 430 where the image data is uploaded to the computer workstation 210. From step 430 subroutine 310 continues to step 440 and returns to subroutine 320 of FIG. 3.

FIG. 5 describes exemplary subroutine 320 from FIG. 3 in which the image data is displayed. Exemplary subroutine 320 begins at starting block 505 and proceeds to step 510 where the computer workstation 210 receives the image data. Once the computer workstation 210 receives the image data in step 510, exemplary subroutine 320 advances to decision block 520 where it is determined if the image data comprise a plurality of preliminary image files. A plurality of preliminary image files may result if, for example, camera 205 was programmed to take a series of pictures of the cable core 110. The capturing time of camera 205 is selected based on the line speed of the advancing fiber optic cable 100. In order to calculate accurately the lay length of the S-Z stranded buffer tube 105, at least two reversals of the S-Z stranded buffer tube 105 should be captured in the image data. Therefore, camera 205 may be controlled to capture a plurality of preliminary image files if at least two reversals cannot be captured in a single image file. The calculation of the lay length is discussed in greater detail with respect to FIG. 6.

If the image data does in fact comprise a plurality of preliminary image files, subroutine 320 advances to step 530 where the plurality of preliminary image files are spliced to create a resulting image file capable of being displayed. The splicing of the plurality of preliminary image files can be achieved, for example, by using an industry standard of image correlation. Image correlation is a method of taking two pictures and overlapping them in different positions and measuring the color difference of the two overlapping areas. The position yielding the least color difference becomes the location of the picture splice. The spliced image will depict a longer segment of the moving cable than any of the individual image files could show.

If at decision block 520 it is determined, however, that the image data does not comprise a plurality of preliminary image files, subroutine 320 continues to step 540 where the image data is converted to a resulting image file capable of being displayed. The resulting image file can be in a variety of different file formats. For example, the image file format and corresponding file extensions can comprise at least any one of the following: tagged image file format (.tif), graphics interchange format (.gif), joint photographic experts group format (.jpg), and bit map format (.bmp). However, embodiments of the present invention envision that any other file formats for the image data will suffice. From step 530 or from step 540, exemplary subroutine 320 advances to step 550 where the resulting image file is displayed on the display 215. From step 550, subroutine 320 continues to step 560 and returns to subroutine 330 of FIG. 3.

FIG. 6 describes the exemplary subroutine 330 from FIG. 3 in which the lay length of the S-Z stranded buffer tube 105 is calculated. Exemplary subroutine 330 begins at starting block 605 and proceeds to step 610 where a selectable control element is positioned by a user on the first reversal point 115 of the S-Z stranded buffer tube 105 shown on the resulting image file as displayed on the display 215. For example, the user may manipulate an input device such as mouse 220, causing the corresponding movement of a selectable control element on the display 215. The aforementioned selectable control element may comprise a cursor. Those skilled in the art will, however, appreciate that other input devices may be utilized as well as other selectable control elements.

Once the selectable control element is positioned by the user on the first reversal point 115 in step 610, exemplary subroutine 330 advances to step 620 where the selectable control element is positioned by the user on the second reversal point 120 of the S-Z stranded buffer tube 105 shown on the resulting image file as displayed on the display 215. After the selectable control element is positioned by the user on the second reversal point 120 in step 620, exemplary subroutine 330 advances to step 630 where the distance between the first reversal point 115 and the second reversal point 120 of the S-Z stranded buffer tube 105 is calculated. Computer workstation 210 detects the aforementioned positioning of the selectable control element on the resulting image file as displayed on the display 215 and executes a programming module to calculate the distance between the first reversal point 115 and the second reversal point 120. To facilitate this calculation, a calibration is performed on the system prior to its use in the manufacturing process. This calibration is accomplished by capturing a calibration image of a measuring device, a scale for example, placed behind a sample stranded core. This calibration image is then used to determine a pixel-to-length ratio utilized in subsequent calculations of the distance D between the first reversal point 115 and the second reversal point 120.

After the distance between the first reversal point 115 and the second reversal point 120 of the S-Z stranded buffer tube 105 is calculated in step 630, exemplary subroutine 330 advances to step 640. At step 640, the user enters the number of turns the S-Z stranded buffer tube 105 makes around cable core 110 between first reversal point 115 and second reversal point 120. For example, the user may enter the number of turns between the first reversal point 115 and the second reversal point 120 by typing a response into the keyboard 225. Alternatively, the user could use the mouse 220 in conjunction with a graphical user interface (GUI) displayed on display 215. A GUI incorporates drag and drop features, icons, and pull-down menus, and preferably uses a mouse. The type of GUI is not significant and may be a WINDOWS, MACINTOSH, or MOTIF GUI, and, in a client/server environment, preferably resides on the client terminal. Those skilled in the art will appreciate that other processes may be used to enter user data.

After the user enters the number of turns between the first reversal point 115 and the second reversal point 120 of the S-Z stranded buffer tube 105 in step 640, exemplary subroutine 330 advances to step 650 where the lay length of the S-Z stranded buffer tube 105 is calculated. Computer workstation 210 executes a program module to calculate the lay length of the cable. This calculation is based on the distance D between first reversal point 115 and second reversal point 120 and the number of turns the S-Z stranded buffer tube 105 makes around the cable core 110 between first reversal point 115 and second reversal point 120 as follows:

Lay Length=D/N, where:

$N=N'+n/T$

D is the axial distance between the reversal points; N is the number of turns between reversals; N' is the number of whole turns between the reversal points; n/T is number of fractional turns, where T is the number of tubes being stranded, and n is the number of tubes which a given tube is offset from its position at the previous reversal point, counted in the direction of rotation. For example, consider the following construction: a six-tube construction, with the sequence of tubes: white, blue, red, green, brown, orange; the white tube is at the top of the cable in the captured image at the first reversal point and the red tube is at the top of the cable in the captured image at the subsequent reversal point. n/T is determined as follows: T=6; n=2 as the white tube is 2 tubes removed from its position at top of cable from last reversal. Note that in this example, the white tube may not be visible at the reversal point. Therefore n/T=⅓, that is the white tube (as well as the other tubes) has gone through and additional ⅓ turn.

This calculated lay length may be displayed on the display 215, and the resulting image file, data entered by the user, and lay length of the S-Z stranded buffer tube 105 may be saved together in a file for future reference. From step 650 subroutine 330 continues to step 660 and returns to step 340 of FIG. 3.

Figure 7:
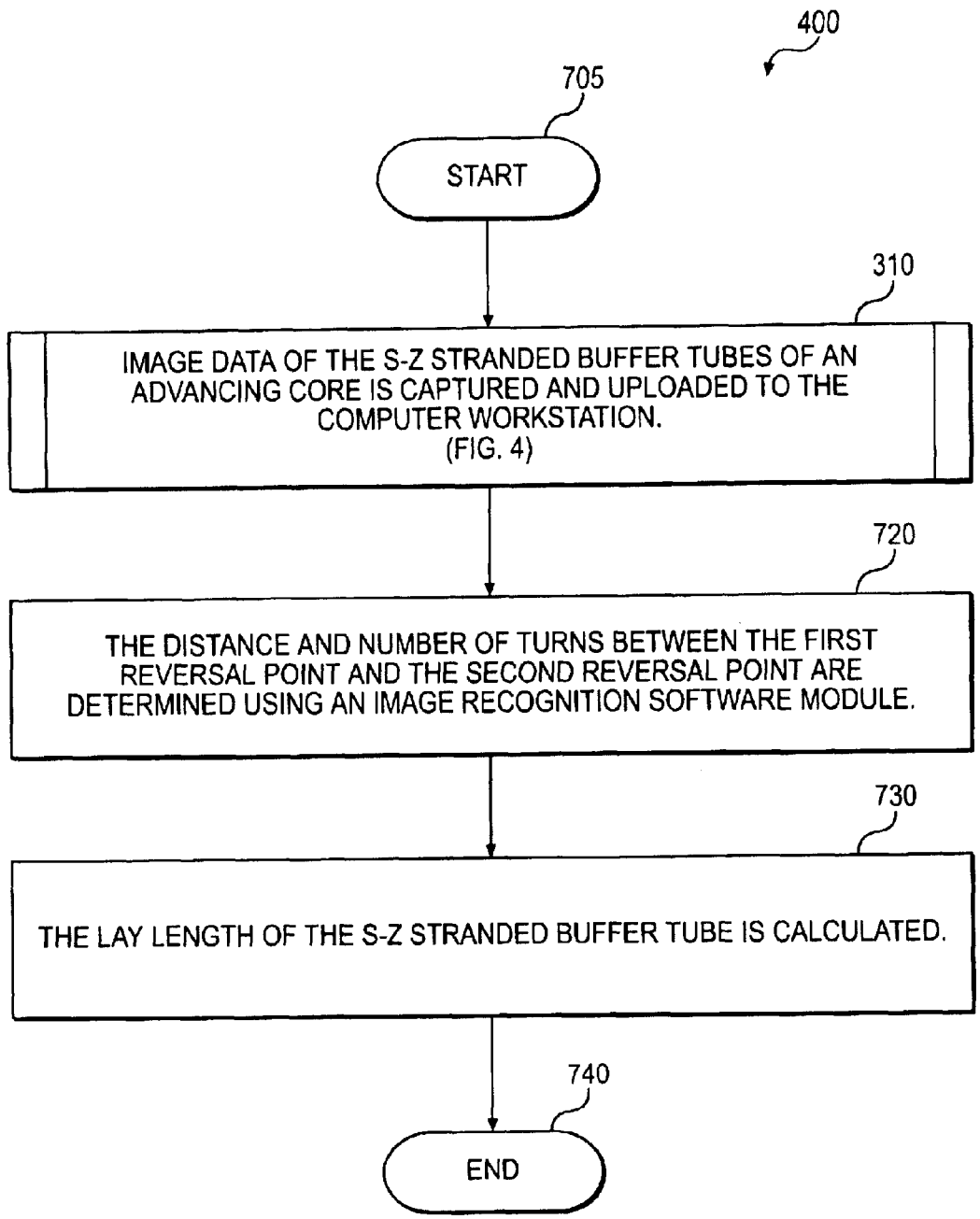
FIG. 7 is a flow chart of a method for determining the lay length of S-Z strands during the manufacturing process consistent with an alternative embodiment of the present invention wherein an image recognition software module is utilized.

FIG. 7 is a flow chart setting forth the general steps involved in an exemplary method 400 which is an alternative embodiment of the present invention for determining the lay length of S-Z strands during the manufacturing process utilizing an image recognition software module. Exemplary method 400 begins at starting block 705 and proceeds to exemplary subroutine 310 where the image data of the S-Z stranded buffer tube 105 of the advancing fiber optic cable 100 is captured and uploaded to the computer workstation 210. The steps comprising subroutine 310 are shown in FIG. 4 and were described in great detail above.

From exemplary subroutine 310 where the image data of the S-Z stranded buffer tube 105 of the advancing fiber optic cable 100 is captured and uploaded to the computer workstation, exemplary method 400 proceeds to step 720 where the distance D between first reversal point 115 and second reversal point 120 and the number of turns the S-Z stranded buffer tube 105 makes around the cable core 110 between first reversal point 115 and second reversal point 120 are determined using the image recognition software module executed on computer workstation 210. Generally, image recognition software programs have the ability to analyze digital images contained in data files and to distinguish features found within the image data. The image recognition software module of this embodiment is able to track a particular buffer tube by its color and also to determine if the slope of the tube is positive, negative, or neutral. In particular, the slope is considered as positive, negative or neutral, when the tube defines, in the image, a positive, negative, or zero angle with the axis of the cable.

This ability of the software allows detecting a reversal point during the passage of the cable. This is done differently when the neutral-slope portion of the tracked tube is directly shown on the captured image or when the same portion is not directly shown (this last case occurring when the tube is in the opposite part of the cable with respect to the camera at the reversal point). When the neutral-slope portion of the tracked tube is directly shown, the software module marks the point of the cable where this neutral-slope portion is detected and identifies this cable point as the reversal point. If the neutral-slope portion of the tracked tube is not shown, the software module can in any case detect the change of slope of the tracked tube and thereby identify the axial position of reversal point. For instance, if the slope changes from positive to negative, the software module will act as follows. First, it will mark the last visible point of the tracked tube having a positive slope and then it will mark the first visible point having a negative slope. Then, the software module determines the point that is halfway from the two marked points and identifies this halfway point as the reversal point of the cable. The distance between the two marked points also allows determining the circumferential position of the tracked tube at the reversal point of the cable. Differently, when the tube is directly shown in the image of the reversal, its circumferential position can be directly determined by the software module.

Being able to detect the axial position of the reversal points of the cable and the circumferential position of the tracked tube in correspondence of each reversal point, the software module can easily measure the distance D between two consecutive reversal points and the number of turns of the tracked tube between the same points.

The distance D can, for example, be obtained by multiplying the time between two reversal point detections and the velocity of the advancing cable. To measure the number of whole turns N' and the fraction of turn n covered by the tracked tube between two reversal points, the software module counts occurrences of the tracked tube along the axis of the cable, starting from the detection of the last reversal point and ending at the detection of the subsequent reversal point, and also takes into account the relative circumferential position of the tracked tube in correspondence of the two reversal points and the slope of the tracked tube between the two reversal points.

For illustration purposes, consider a cable having a six-tube construction, with the following sequence of tubes: white, blue, red, green, brown, orange; the white tube is at the top of the cable (the reference position) in the captured image at the first reversal point and the green tube is at the top of the cable in the captured image at the subsequent reversal point. In this example the white tube neutral slope section is not visible in the image of the second reversal point. By comparing the circumferential positions of the white tube at the two reversal points, the software module will determine that an additional ½ turn has to be added to the whole number of turns of the tube.

From this analysis, the position of first reversal point 115 and second reversal point 120, the number of turns between first reversal point 115 and second reversal point 120, and the fractional turns between first reversal point 115 and second reversal point 120 can be determined without user input. From the determination of the position of first reversal point 115 and second reversal point 120, the image recognition software module can determine the distance D between first reversal point 115 and second reversal point 120.

From step 720 where the distance D between first reversal point 115 and second reversal point 120 and the number of turns the S-Z stranded buffer tube 105 makes around the cable core 110 between first reversal point 115 and second reversal point 120 is determined using the image recognition software module executed on computer workstation 210, exemplary method 400 advances to step 730 where the lay length of the S-Z stranded buffer tube is calculated. Computer workstation 210 executes a program module to calculate the lay length of the cable. This calculation is based on the distance D between first reversal point 115 and second reversal point 120 and the number of turns the S-Z stranded buffer tube 105 makes around the cable core 110 between first reversal point 115 and second reversal point 120, in the manner described above with respect to FIG. 6. This calculated lay length may be displayed on the display 215, and the resulting image file, data entered by the user, and lay length of the S-Z stranded buffer tube 105 may be saved together in a file for future reference. From step 730 where the lay length of the S-Z stranded buffer tube is calculated, exemplary method 400 continues to step 740 and ends.

In view of the foregoing, it will be appreciated that the present invention measures the lay length of S-Z strands during the manufacturing process. Still, it should be understood that the foregoing relates only to the exemplary embodiments of the present invention, and that numerous changes may be made thereto without departing from the spirit and scope of the invention as defined by the following claims.

What is claimed is:

1. A method of measuring the lay length of buffer tubes S-Z stranded on an optical fiber cable core while advancing the core during manufacturing, comprising the steps of:
   capturing at least one image of the S-Z stranded buffer tubes containing at least two reversal points on the advancing core, each image having at least two reversal points;
   downloading the captured image to a storage device; and
   measuring the lay length of the S-Z stranded buffer tubes via the storage device.

2. The method of claim 1, further comprising the step of storing the captured image and the lay length measurement in the storage device.

3. The method of claim 1, wherein the capturing step comprises the substep of capturing a plurality of preliminary images and the measuring step comprises the substep of splicing the plurality of preliminary images.

4. The method of claim 1, wherein the capturing step comprises the substep of triggering a camera to take at least one image of the advancing core.

5. The method of claim 4, wherein the substep of triggering occurs when an image recognition software module within the storage and display device detects one of the at least two reversal points.

6. The method of claim 1, further comprising the step of assembling the at least one image into a bitmap on a display device, wherein the image is displayed.

7. The method of claim 6, wherein the measuring step comprises the substeps of positioning cursors at the at least two reversal points on the displayed image and determining the distance between the cursors, wherein the distance between the reversal points is determined.

8. The method of claim 7, wherein the measuring step comprises the substeps of:
   counting the number of complete turns between the at least two reversal points on the displayed image;
   determining the number of fractional turns between the at least two reversal points on the displayed image; and
   calculating the lay length with the relation:

$$\text{Lay Length} = D/(N'+n/T)$$

wherein D is the distance between the reversal points, N' is the number of complete turns between the reversal points, and n/T is the fractional number of turns between the reversal points.

9. The method of claim 1, wherein the measuring step is performed by an image recognition software module executed in the storage device configured to perform the following substeps:
   detecting the number of complete turns between the at least two reversal points on the displayed image;
   determining the number of fractional turns between the at least two reversal points on the displayed image; and
   calculating the lay length with the relation:

$$\text{Lay Length} = D/(N'+n/T)$$

wherein D is the distance between the reversal points, N' is the number of complete turns between the reversal points, and n/T is the fractional number of turns between the reversal points.

10. A system of measuring the lay length of buffer tubes S-Z stranded on an optical fiber cable core while advancing the core during manufacture comprising:
   a camera configured to capture at least one image of the S-Z stranded buffer tubes containing at least two reversal points on the advancing core, each image having at least two reversal points; and
   a computer configured to receive the captured image and determine the lay length of the S-Z stranded buffer tubes captured in the image.

11. The system of claim 10, wherein the image comprises a plurality of preliminary images spliced together.

12. The system of claim 10, wherein the computer is further configured to store the image and the lay length.

13. The system of claim 10, wherein the computer is further configured to display the image by converting the image into a displayable format and placing the image on a display.

14. The system of claim 13, wherein the displayable format is selected from the group comprising tagged image file format (tif), graphics interchange format (gif), joint photographic experts group format (jpeg), and bit map format (bmp).

15. The system of claim 10, wherein the computer is further configured to determine the lay length of the S-Z stranded buffer tubes by calculating the lay length with the relation:

$$\text{Lay Length } D/(N'+n/T)$$

wherein D is the distance between the reversal points, N' is the number of complete turns between the reversal points, and n/T is the fractional number of turns between the reversal points.

16. The system of claim 15, further comprising a component for receiving D through user input into the computer by the user positioning cursors at the reversal points of the image displayed by the computer and the computer determining the distance D based upon the cursors' position.

17. The system of claim 15, further comprising a component for determining D by the computer detecting the at least two reversal points of the image and determining the distance D based upon the distance between the detected reversal points.

* * * * *

UNITED STATES PATENT AND TRADEMARK OFFICE
CERTIFICATE OF CORRECTION

PATENT NO. : 6,728,453 B2
APPLICATION NO. : 09/891364
DATED : April 27, 2004
INVENTOR(S) : Michael Petryszak Page 1 of 1

It is certified that error appears in the above-identified patent and that said Letters Patent is hereby corrected as shown below:

In the Claims

Claim 15, column 12, line 59, "Lay Length $D/(N'+n/T)$" should read --Lay Length $= D/(N'+n/T)$--.

Signed and Sealed this
Thirteenth Day of August, 2013

Teresa Stanek Rea
*Acting Director of the United States Patent and Trademark Office*